(12) United States Patent
Finders (10) Patent No.: US 11,054,037 B2
(45) Date of Patent: Jul. 6, 2021

(54) MECHANICAL SEAL

(71) Applicant: Forrest Lee Finders, Knoxville, TN (US)

(72) Inventor: Forrest Lee Finders, Knoxville, TN (US)

(73) Assignee: AES Engineering Ltd., Rotherham (GB)

( * ) Notice: Subject to any disclaimer, the term of this patent is extended or adjusted under 35 U.S.C. 154(b) by 83 days.

(21) Appl. No.: 16/239,964

(22) Filed: Jan. 4, 2019

(65) Prior Publication Data

US 2019/0211931 A1    Jul. 11, 2019

Related U.S. Application Data

(60) Provisional application No. 62/615,722, filed on Jan. 10, 2018.

(51) Int. Cl.
   *F16J 15/34* (2006.01)
(52) U.S. Cl.
   CPC ....... *F16J 15/3436* (2013.01); *F16J 15/3464* (2013.01)
(58) Field of Classification Search
   CPC ...... F16J 15/3436; F16J 15/3464; F16J 15/34; F16J 15/3472
   See application file for complete search history.

(56) References Cited

U.S. PATENT DOCUMENTS

| | | | | |
|---|---|---|---|---|
| 2,489,781 A * | 11/1949 | Isenbarger | ............... | F16J 15/36 277/373 |
| 3,193,298 A * | 7/1965 | Voitik | ...................... | F16J 15/38 277/373 |
| 3,430,967 A * | 3/1969 | Junker | .................... | F16J 15/348 277/589 |
| 3,689,083 A * | 9/1972 | Greenawalt | .............. | F16J 15/38 277/372 |
| 4,304,408 A * | 12/1981 | Greenawalt | ............ | F16J 15/348 277/373 |
| 4,389,051 A * | 6/1983 | Mullaney | ............. | F16J 15/3452 277/373 |
| 4,417,734 A * | 11/1983 | Sundberg | ............. | F16J 15/3464 277/385 |
| 4,519,582 A * | 5/1985 | Freeman | ................... | F16K 3/02 251/167 |
| 5,076,589 A * | 12/1991 | Marsi | ..................... | F16J 15/006 277/319 |

(Continued)

FOREIGN PATENT DOCUMENTS

CN        201368201 Y       12/2009
EP        0443579 A2        2/1991

(Continued)

*Primary Examiner* — Eugene G Byrd
(74) *Attorney, Agent, or Firm* — Edwin D. Schindler (57) ABSTRACT

A mechanical seal includes a drive ring having an axially extending drive element and a seal face with an outer substantially cylindrical surface that is provided with a corresponding radially reduced portion that is can be engaged by the drive element, in which the radially reduced portion is a flat surface that is, in transverse section a chord, and the drive element is provided with a flat surface that can engage with the flat surface of the radially reduced portion during driving rotation of the seal face by the drive ring.

7 Claims, 7 Drawing Sheets

(56) References Cited

U.S. PATENT DOCUMENTS

| | | | | |
|---|---|---|---|---|
| 5,556,110 A | * | 9/1996 | Marsi | F16J 15/3464 |
| | | | | 277/397 |
| 5,558,342 A | * | 9/1996 | Sedy | F16J 15/3464 |
| | | | | 277/390 |
| 6,131,913 A | * | 10/2000 | Auber | F16J 15/3464 |
| | | | | 277/372 |
| 7,870,654 B2 | * | 1/2011 | Kametaka | F16J 15/348 |
| | | | | 29/450 |
| 2005/0242515 A1 | * | 11/2005 | Brooks | F16J 15/38 |
| | | | | 277/370 |
| 2010/0148448 A1 | * | 6/2010 | Pinto | F16J 15/348 |
| | | | | 277/371 |
| 2018/0347697 A1 | * | 12/2018 | Ventura | F16J 15/3476 |

FOREIGN PATENT DOCUMENTS

| | | | | | |
|---|---|---|---|---|---|
| JP | | 06174109 A | * | 6/1994 | ........... F16J 15/3464 |
| JP | | 06229479 A | * | 8/1994 | ........... F16C 35/077 |
| WO | WO 2018/124252 A1 | | | 7/2018 | |

* cited by examiner

PRIOR ART

PRIOR ART

PRIOR ART

PRIOR ART

MECHANICAL SEAL

CROSS-REFERENCE TO RELATED APPLICATION

The inventor claims domestic priority, pursuant to 35 U.S.C. § 119(e), on the basis of U.S. Provisional Patent Application No. 62/615,722, filed Jan. 10, 2018, the entire disclosure of which shall be deemed to be incorporated by reference herein.

BACKGROUND OF THE INVENTION

Technical Field of the Invention

The present invention relates to mechanical seals and, more particularly, to driving mechanisms for mechanical seals.

Description of the Prior Art

A mechanical seal comprises a "floating" component, which is mounted for axial movement around the rotary shaft of, for example, a pump. The mechanical seal also comprises a "static" component, which is axially fixed and is typically secured to a housing. The floating component has a flat annular end face providing a seal face which is directed towards a complimentary seal face of the static component. The floating component is urged, usually by means of one or more springs, towards the static component to close the seal faces together to form a sliding face seal. In use, one of the floating and static components rotate. This rotating component is referred to as the rotary component. The other of the floating and static components does not rotate and is referred to as the stationary component.

Those mechanical seals whose floating component is rotary are described as rotary seals. Alternatively, if the floating component is stationary, the mechanical seal is referred to as a stationery seal.

Seal faces are generally held to their relevant stationery or rotary components by a so-called drive ring. The drive ring may be provided with drive pins that are pressed firmly into holes in the drive ring. These drive pins engage with slots in the seal face.

SUMMARY OF THE INVENTION

A mechanical seal having a drive ring provided with one or more axially extending drive elements and a seal face having an outer substantially cylindrical surface provided with one or more corresponding radially reduced portions engageable by the drive elements, wherein the or each radially reduced portion is a flat surface which in transverse section is a chord and the or each drive element provides a flat surface engageable with the flat surface of a corresponding radially reduced portion during driving rotation of the seal face by the drive ring.

A mechanical seal of the invention provides a cost-effective design which can be applied to virtually all current face geometries with minimal alteration.

In a mechanical seal of the present invention, drive is applied in direct proximity to the sealing interface with very little longitudinal displacement to add an angularity component. The arrangement is comparatively free of point or line stress risers during rotation, compared with existing drive arrangements known to the state of the art.

Both axial and radial flat-on-flat drive surfaces may be provided.

The present invention provides large axial and radial flat-on-flat drive surfaces. There can be at least a 700% better force distribution on driven surfaces compared with pin or lug arrangements.

The present invention minimizes distortions transmitted into sealing surfaces as drive forces are primarily directed inward towards the sturdiest cross-section of the face instead of axially.

The invention provides an excellent drive for carbon materials due to drastically reduced shearing forces.

Bi-directional anti-rotational drive may be provided in the mechanical seal of the present invention.

The seal may be set upon initial build for either clockwise ("C.W.") or counter-clockwise ("C.C.W.") rotation, thereby eliminating any travel between the driving surface and the driven surface.

The drive forces are applied in close proximity directly over mating sealing surfaces, rather than being axially displaced. The drive forces are directed mainly towards the inner diameter ("I.D.") of the sealing face component instead of its outer diameter ("O.D.")

Shearing on the O.D. of the sealing face component may be substantially minimized. The drive forces may be applied to the sturdiest cross-section of the sealing face.

The concept of the present invention may be applied to virtually all current face geometrical configurations.

The drive arrangement of a mechanical seal of the invention does not require additional axial length and, in cases where previously a face was driven from the rear, the axial length may be decreased.

The drive arrangement of a mechanical seal of the invention can aid in inducing low-level turbulence in the fluid surrounding the sealing faces, thereby helping both heat removal and particle dispersion.

The drive arrangement of the mechanical seal of the present invention may be much stronger than existing pin drives.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

Figure 1A:
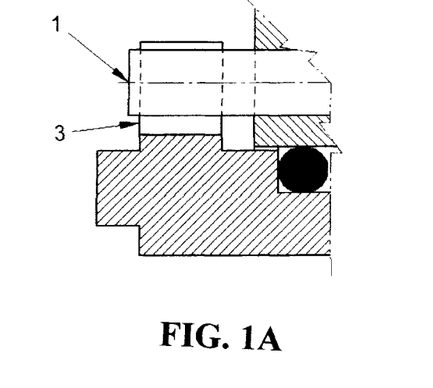
FIG. 1A shows, in a longitudinal section, a drive pin located in a slot in a circumferential flange in the seal face of a prior art mechanical seal apparatus.
Figure 1B:
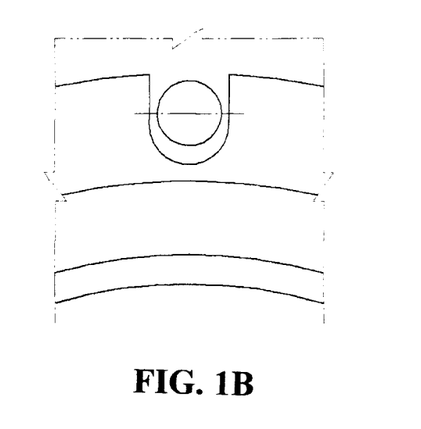
FIG. 1B shows, in a longitudinal section, the drive pin of the slot in the circumferential flange in the seal face of the prior art mechanical seal apparatus of FIG. 1A.
Figure 1C:
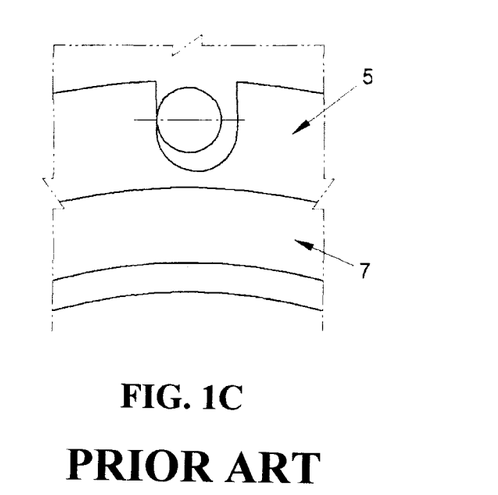
FIG. 1C shows, in a longitudinal section, the drive pin bearing against a side wall of the slot in the circumferential flange in the seal face of the prior art mechanical seal apparatus of FIG. 1B.

The invention will now be described, by way of example only, with reference to the accompanying drawings:

FIGS. 1A, 1B and 1C of the accompanying drawings illustrate a prior art mechanical seal apparatus. FIG. 1A shows, in longitudinal sections, a drive pin 1 located in slot 3 in a circumferential flange 5 in the seal face 7. Flange 5 is generally of rather small thickness. Another view is provided by FIG. 1B. In FIG. 1C, the drive pin 1 is shown bearing against the wall of slot 3. There is a very heavy line contact, high shearing forces being applied to the side wall of the drive slot 3.

Figure 2A:
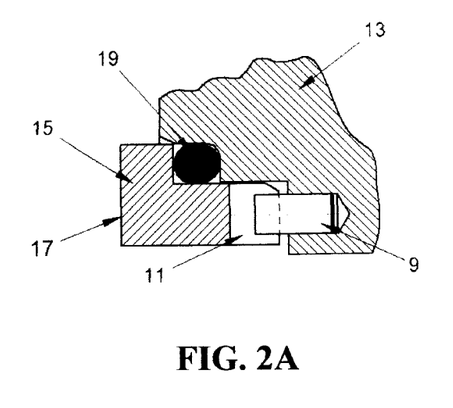
FIG. 2A shows another prior art mechanical seal arrangement with a round axial pin drive, in which there is a relatively shallow insertion of the pin into a round bottom faced drive slot so that the drive contact line is minimal.
Figure 2B:
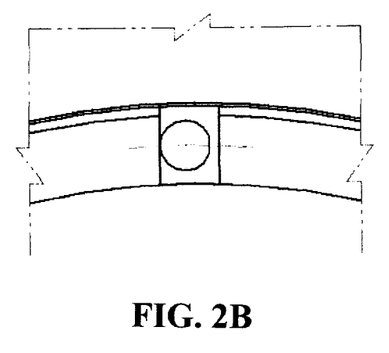
FIG. 2B shows the prior art mechanical seal arrangement of FIG. 2A, in which there is a very high line-contact stress riser on the drive slot wall.
Figure 2C:
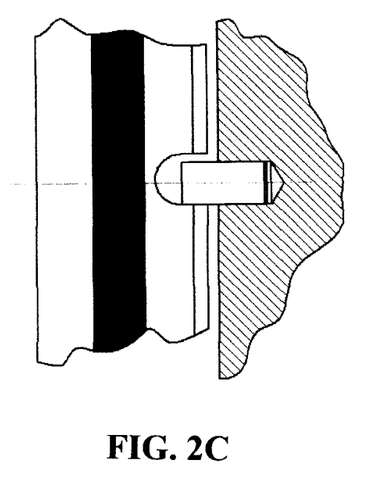
FIG. 2C shows the prior art mechanical seal arrangement of FIGS. 2A and 2B, in which there is a round fixed drive pin.

FIGS. 2A, 2B and 2C of the accompanying drawings illustrate another prior art mechanical seal arrangement with a round axial pin drive. This mechanical seal arrangement includes a housing 13, a sealing face having a sealing surface 17 and an O-ring 19 providing sealing between the housing 13 and the sealing face 15. As shown in FIG. 2A there is a relatively shallow insertion of the pin in to the round bottom faced drive slot 11 so the drive contact line is minimal. Even so, there is a very high line-contact stress riser on the drive slot wall, as illustrated in FIG. 2B. Furthermore the thin cross-section on the tail of the seal face may be easily broken when the material is soft or brittle. If the pin protrudes too far into the round bottom drive slot, the driving forces can be transmitted by an extremely high point contact. FIG. 2C shows the prior art mechanical seal arrangement of FIGS. 2A and 2B, in which there is a round fixed drive pin.

Figure 3A:
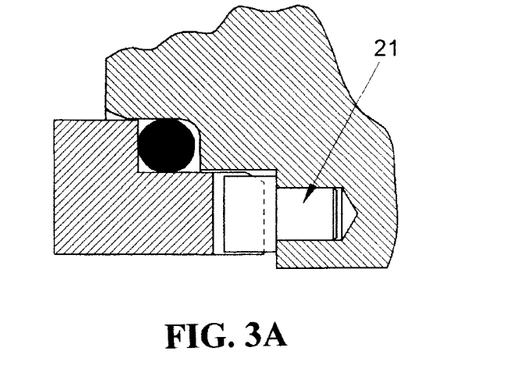
FIG. 3A illustrates a further prior art mechanical seal arrangement having a square floating pin drive, in which there is a small actual flat contact surface between the pin and the seal face slot to disperse force and is axially distant from the sealing surface of the seal face where forces are produced.
Figure 3B:
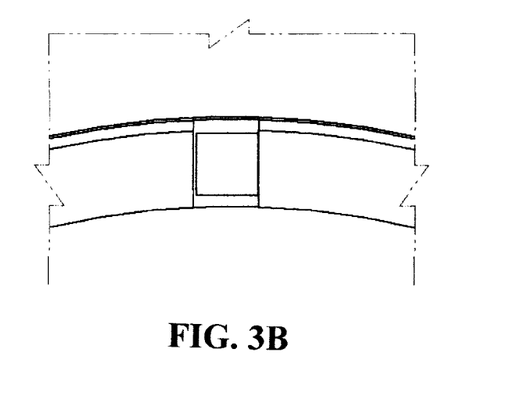
FIG. 3B shows the prior art mechanical seal arrangement of FIG. 3A having a thin cross-section of the tail of the seal face, which may be easily broken when the material is soft or brittle.
Figure 3C:
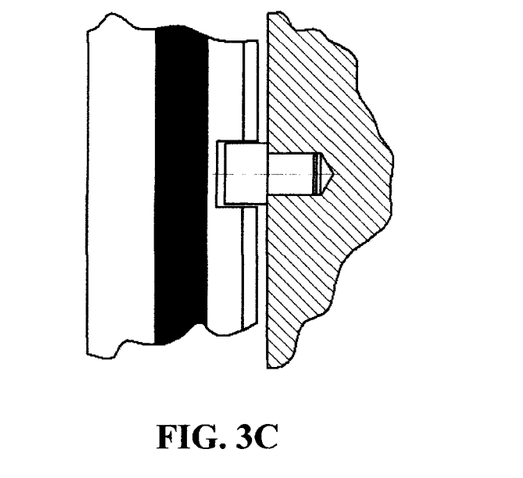
FIG. 3C shows the prior art mechanical seal arrangement of FIG. 3A having a square floating pin.

FIGS. 3A, 3B and 3C illustrate a further prior art mechanical seal arrangement involving a square floating pin drive. This prior art mechanical seal arrangement is similar to that of FIGS. 2A, 2B and 2C, but includes a square floating pin 21 which provides a small actual flat contact surface between the pin and the seal face, thereby dispersing force and being axially distant from the sealing surface of the sealing face where the forces are produced. As with the round axial pin drive of FIGS. 2A, 2B and 2C, the thin cross-section on the tail of the seal face may be easily broken when the material is soft or brittle.

Figure 4A:
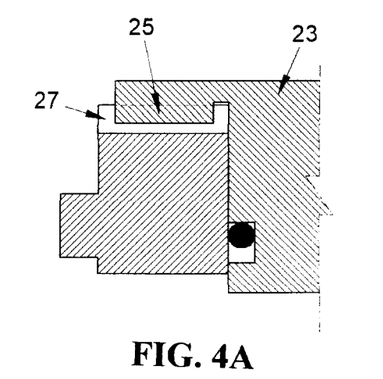
FIG. 4A is a cross-sectional view of another prior art mechanical seal drive arrangement in which there is a crimped or rounded nose to slot configuration.
Figure 4B:
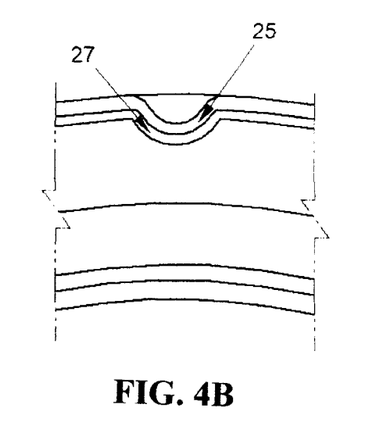
FIG. 4B shows the seal face of the prior art mechanical seal arrangement of FIG. 4A.
Figure 4C:
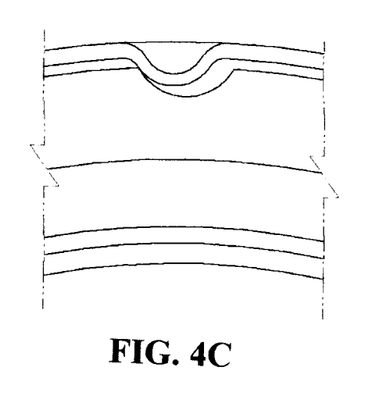
FIG. 4C shows the position when the face of the prior art mechanical seal arrangement of FIG. 4A is rotated clockwise and it can be seen that there is a heavy line contact stress riser and high shearing forces are applied to the outer diameter ("O.D.") of the drive notch.

FIGS. 4A, 4B and 4C of the accompanying drawings show another prior art mechanical seal drive arrangement in which there is a crimped or rounded nose to slot configuration. The face holder is provided with one or more notches 25 which extend into rounded nose recesses 27. FIG. 4C shows the position when the face is rotated clockwise and it can be seen that there is a heavy line contact stress riser and high shearing forces are applied to the outer diameter ("O.D.") of the drive notch.

Figure 5A:
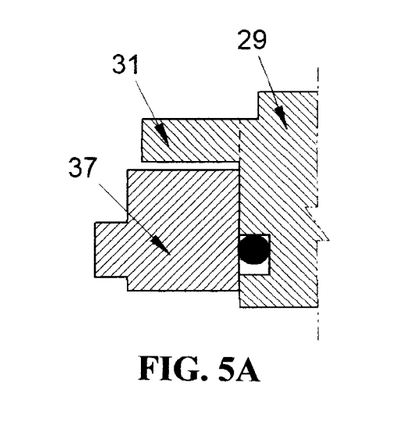
FIG. 5A is a cross-sectional view of a flat tang drive mechanical seal apparatus of the present invention.
Figure 5B:
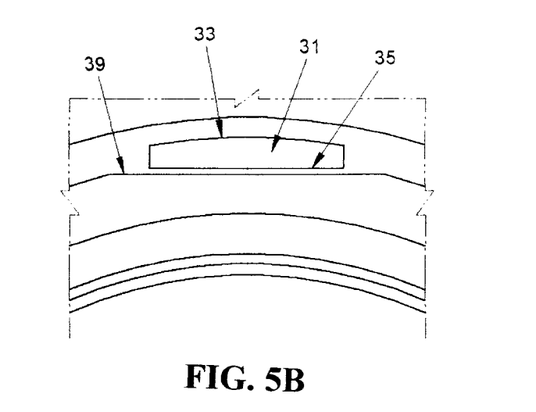
FIG. 5B illustrates a drive element of the flat tang drive of the mechanical seal apparatus of FIG. 5A.
Figure 5C:
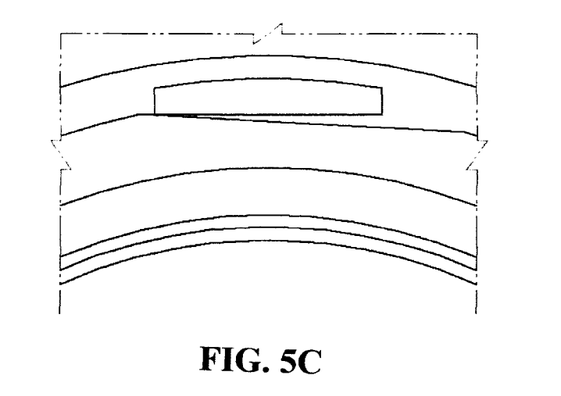
FIG. 5C shows the drive element of the flat tang drive of the mechanical seal apparatus of FIG. 5B rotated clockwise.
Figure 6:
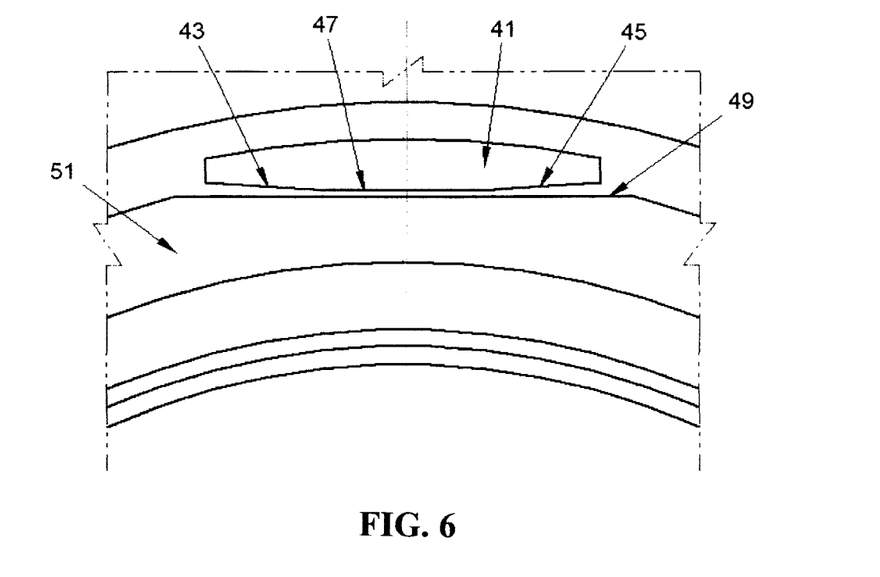
FIG. 6 is a front view providing greater detail of the first preferred embodiment of the mechanical seal apparatus of FIG. 5.

Referring to FIGS. 5A, 5B and 5C of the accompanying drawings, drive ring 29 of a first preferred embodiment of the mechanical seal apparatus of the present invention is provided with one more axially extending drive elements 31; the or each of which is shaped like the tang of a sword as seen, for instance, in FIG. 5B. The outer long face 33 of tang 31 is slightly curved whereas the inner face 35 is flat.

Seal face 37 has, for the (or each) tang 31, a flat portion 39 which is a chord of the circular cross-section of the seal face. It can be seen from FIG. 5C that, when drive ring 29 is driving seal face 37 in a clockwise direction, there is a heavy line contact stress riser between tang 31 and flat 39 of the seal face. High shearing forces are applied at the O.D. of the drive flat.

Referring to FIGS. 6 to 9, the drive arrangement of a second preferred embodiment of the mechanical seal apparatus of the present invention is substantially as described above in connection with the first preferred embodiment. However, in the case of the second preferred embodiment, the inner surface of tang 41 comprises, in cross-section, two angled portions 43, 45 separated by a central portion 47. Central portion 47 is parallel to the flat 49 of the seal face 51, whereas the two angled portions 43, 45 are angled so that the gap between tang 41 and flat 49 increases in a direction away the central portion 47. In this preferred embodiment the mechanical seal is provided with two tangs 41 spaced 180° apart.

Figure 7:
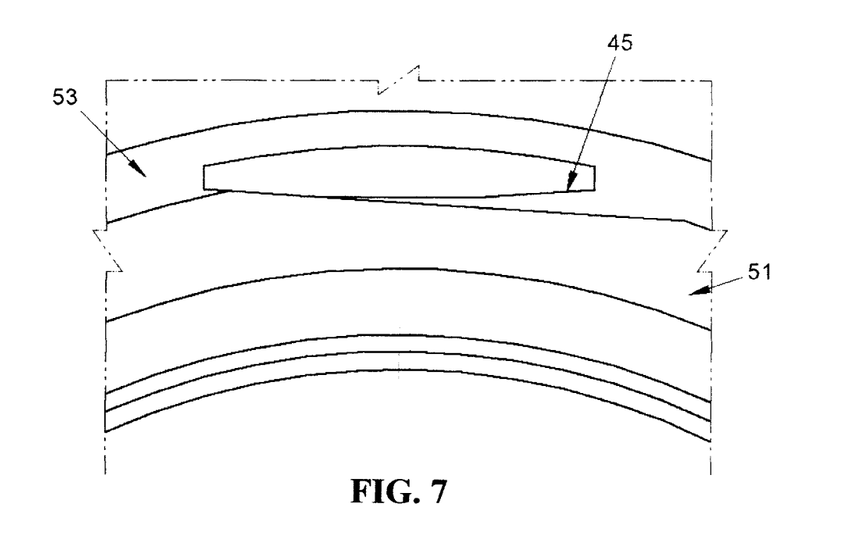
FIG. 7 illustrates a second preferred embodiment of FIG. 6 the mechanical seal drive apparatus of the present invention with the seal face rotated counterclockwise.

Referring particularly to FIG. 7, it can be seen that, when the drive ring 53 is in driving engagement with seal face 51, in this case, so that the face is rotating in a clockwise direction, then there is a large radial surface contact area between the tang flat 43 and the face flat 49. Accordingly, there are no line or point stress risers and there is a small shearing force as most of the anti-rotation forces are applied compressively towards the face inner diameter ("I.D."), thereby taking advantage of the maximum strength characteristics.

If an extreme starting torque is expected, the tang and face may be aligned during initial assessment for clockwise or counter-clockwise rotation so that no radial movement is required between the driving and the driven surfaces eliminating high impact force upon contact.

The second angled flat 45 allows for bi-directional rotation. It also allows for a reverse impeller or shaft rotation if required.

Figure 8:
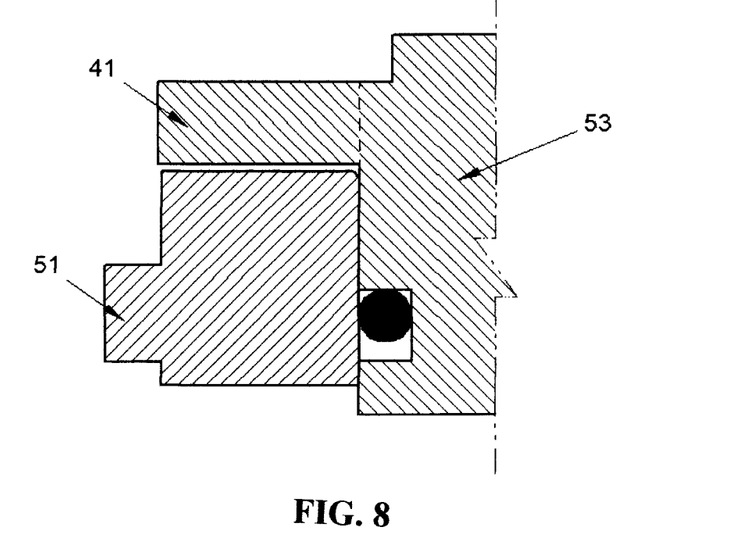
FIG. 8 shows, in profile, the second preferred embodiment of the mechanical seal drive apparatus of FIG. 7, with a large axial flat surface area on the tang tgo disperse radial drive forces; and, FIG. 9 is a perspective view of the drive ring of the second preferred embodiment of the mechanical seal drive apparatus of FIG. 7.
Figure 9:
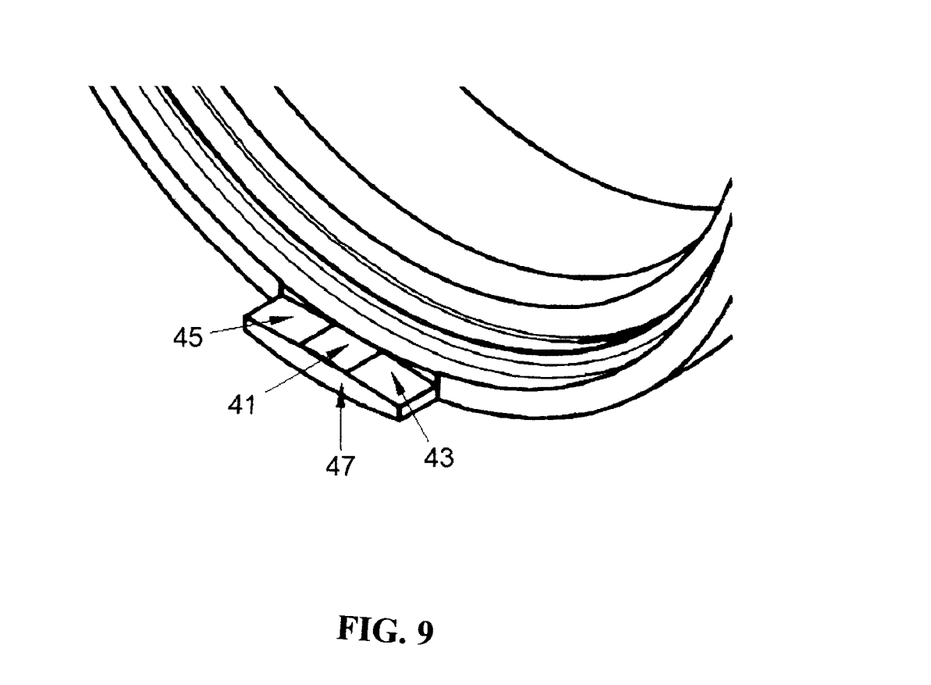

The large axial flat surface area on tang 41 disperses the radial drive force. The large axial flat surface area on seal face 51 disperses radial drive forces. As shown in FIG. 8, only a small installation gap is required between the tang I.D. flats and the seal O.D. flats. FIG. 8 also illustrates a tang 41 that extends very slightly past the face flat to ensure there are no stress risers to the sealing surfaces.

While only several embodiments of the present invention have been shown and described, it will be obvious to those skilled in the art that many modifications may be made to the present invention without departing from the spirit and scope thereof.

What is claimed is:

1. A mechanical seal, comprising a drive ring having an axially extending drive element and a seal face having an outer substantially cylindrical surface provided with a corresponding radially reduced portion engageable by said drive element, wherein said radially reduced portion provides a first flat surface that is, in transverse section, a chord, said drive element providing a second flat surface engageable with the first flat surface of said radially reduced portion during driving rotation of said seal face by said drive ring, said first flat surface of said radially reduced portion engageable by said drive element and said second flat surface of said drive element being opposing respective surfaces that are flat in a circumferential direction, said second flat surface being a central portion of said drive element flanked by angled portions.

2. The mechanical seal according to claim 1, wherein the second flat surface of said drive element extends across an entirety of said drive element.

3. The mechanical seal according to claim 1, wherein said drive element is shaped as a tang.

4. The mechanical seal according to claim 1, further comprising an additional drive element, wherein said drive element and said additional drive element are spaced 180° apart.

5. The mechanical seal according to claim 1, wherein an installation gap is provided between the first flat surface of said radially reduced portion and the second flat surface of said drive element.

6. The mechanical seal according to claim 1, wherein said drive element extends beyond the first flat surface of said radially reduced portion.

7. The mechanical seal according to claim 1, further comprising a plurality of drive elements and a corresponding plurality of radially reduced portions.

* * * * *